June 9, 1936.   J. M. COLBY   2,043,233
TRACK FOR THE WHEELS OF VEHICLES
Filed Nov. 15, 1934
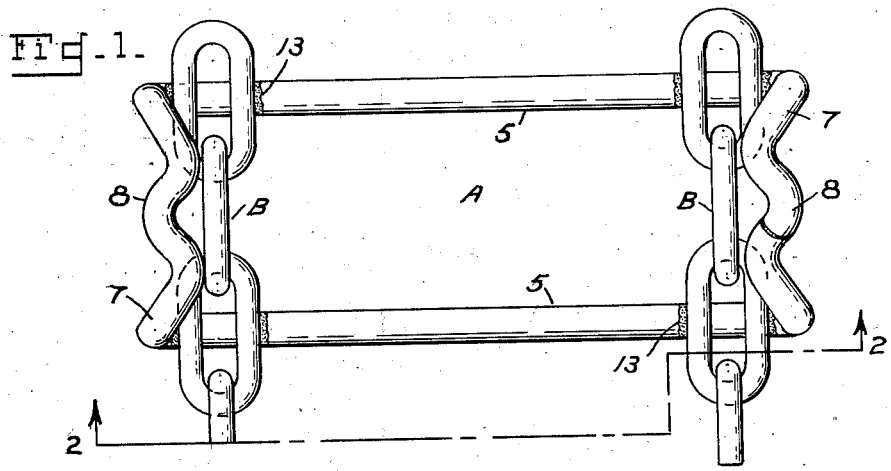
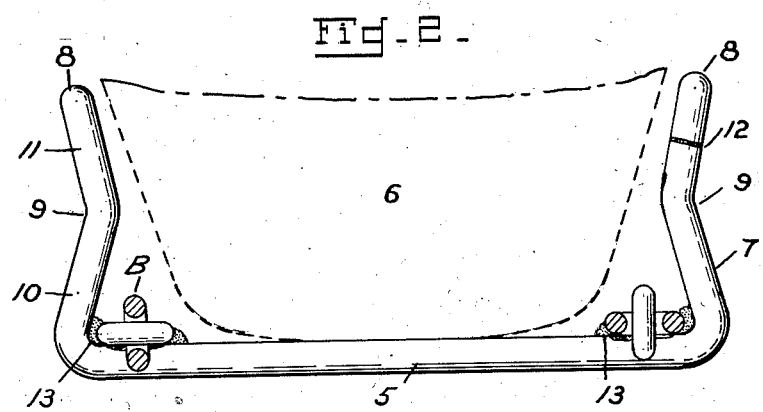
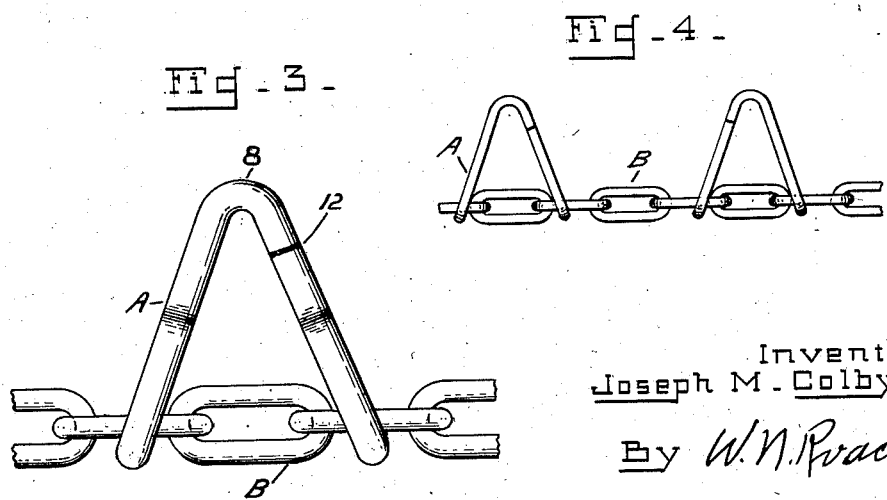
Inventor
Joseph M. Colby
By W. N. Roach
Attorney Patented June 9, 1936

2,043,233

UNITED STATES PATENT OFFICE 2,043,233

TRACK FOR THE WHEELS OF VEHICLES

Joseph M. Colby, United States Army,
Watertown, Mass.

Application November 15, 1934, Serial No. 753,163

3 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a track for the wheels of a vehicle.

The purpose of the invention is to provide a simple, inexpensive track which will be of light weight and will insure positive drive between the wheels and track without creeping or slipping.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is an inside plan view of a portion of an endless track constructed in accordance with the invention.

Fig. 2 is a sectional view on the line 2—2 of Fig. 1.

Fig. 3 is a view in side elevation of Fig. 1.

Fig. 4 is a view in side elevation of several track sections.

Referring to the drawing by characters of reference there is shown a portion of a chain adapted to serve as an endless track for the wheel or wheels of a vehicle. The track consists of a series of grousers or shoes A secured to a pair of link chains B—B.

The shoes are all identical and each one consists of a rod shaped to provide a pair of parallel cleats or crossbars 5—5 adapted to be positioned transversely of the tire 6 of a vehicle and joined at their ends by a pair of side bars or wheel guides 7—7 disposed substantially perpendicularly to the plane of the crossbars and adapted to embrace the sides of the tire. Each of the guides 7 is preferably tapered towards its extremity 8 (Fig. 3) and is bent inwardly towards the tire intermediate its height as shown at 9 so that the base portion 10 of the guide provides a pocket for the chain B and the upper or outer portion 11 flares outwardly to accommodate the flare of the tire.

The shoe just described is preferably formed of a single length of rod and the two ends are joined by welding as at 12.

The link chains B are secured to the inner sides of the crossbars by welding 13 and are positioned in the pockets between the base portion 10 of the guide and the crossbars 5. Alternate links of the chains lie flat on the crossbars and the intermediate links between the crossbars 5—5 of one shoe and between the adjacent crossbars of adjacent shoes are perpendicular to the plane containing the crossbars.

In operation the resilient tires 6 contact the ground between the crossbars and the weight of the vehicle causes the crossbars to be pressed into and grip the tire. The track being of open construction will not become clogged with earth or snow.

I claim:

1. In a wheel track, a plurality of similar sections, each section formed of a single length of rod bent to provide a pair of spaced crossbars and wheel guides at the ends of the crossbars, a pair of link chains connecting the sections, each chain extending over corresponding ends of the crossbars adjacent the wheel guides and having links lying flat on and welded to the inner sides of the crossbars.

2. In a wheel track, a plurality of similar sections, each section comprising a pair of spaced crossbars and wheel guides at the ends of the crossbars, said crossbars and guides formed of rod material, link chains extending over the crossbars and having alternate links lying flat on and welded to the crossbars and intermediate links disposed between the crossbars of one shoe and between adjacent crossbars of adjacent shoes.

3. In a wheel track, a plurality of similar sections, each section comprising a pair of spaced crossbars and wheel guides at the ends of the crossbars, said crossbars and guides formed of rod material, link chains extending over the crossbars and having links lying flat thereon and welded thereto.

JOSEPH M. COLBY.